United States Patent
Jeglia

(10) Patent No.: US 9,907,290 B2
(45) Date of Patent: Mar. 6, 2018

(54) MULTI-LEVEL PET TABLE

(71) Applicant: Arrival Enterprises, LLC, St. Louis, MO (US)

(72) Inventor: Christopher J. Jeglia, Overland, MO (US)

(*) Notice: Subject to any disclaimer, the term of this patent is extended or adjusted under 35 U.S.C. 154(b) by 292 days.

(21) Appl. No.: 14/838,558

(22) Filed: Aug. 28, 2015

(65) Prior Publication Data
US 2016/0057973 A1     Mar. 3, 2016

Related U.S. Application Data

(60) Provisional application No. 62/042,873, filed on Aug. 28, 2014.

(51) Int. Cl.
*A01K 5/00* (2006.01)
*A01K 29/00* (2006.01)

(52) U.S. Cl.
CPC ............ *A01K 5/00* (2013.01); *A01K 29/00* (2013.01)

(58) Field of Classification Search
CPC .......... A01K 1/03; A01K 1/031; A01K 1/032; A01K 1/033; A01K 1/034; A01K 1/035; A01K 1/0353; A01K 5/00; A01K 29/00
USPC ........ 119/51.01, 57.8, 61.3, 61.57, 475, 482, 119/706; 108/50.11, 59, 92, 93
See application file for complete search history.

(56) References Cited

U.S. PATENT DOCUMENTS

| | | | | |
|---|---|---|---|---|
| 3,774,576 A * | 11/1973 | Moore | ............... | A01K 1/03 119/480 |
| 4,347,807 A * | 9/1982 | Reich | ............... | A01K 1/033 119/499 |
| 4,497,279 A * | 2/1985 | Bell | ............... | A01K 15/024 119/706 |
| D284,533 S * | 7/1986 | Berry, Jr. | ............... | D6/672 |
| 5,080,042 A * | 1/1992 | Rubin | ............... | A01K 15/027 119/706 |
| 6,209,491 B1 * | 4/2001 | Olson | ............... | A01K 1/0353 119/702 |
| 6,378,463 B1 * | 4/2002 | Simmons | ............... | A01K 1/0353 119/707 |
| 7,681,524 B1 * | 3/2010 | Hudson | ............... | A01K 1/0107 119/28.5 |
| 8,020,518 B1 * | 9/2011 | Reinke | ............... | A01K 15/025 119/482 |
| 2007/0034121 A1 * | 2/2007 | Kim | ............... | A47B 87/0246 108/92 |

(Continued)

*Primary Examiner* — Joshua E Rodden
(74) *Attorney, Agent, or Firm* — Charles McCluskey

(57) ABSTRACT

A Multi-Level Pet Table has a lower plate, a lower cover upon the lower plate, four legs upon corners of the lower plate, an upper plate connecting to the four legs upon its corners, an upper cover upon the upper plate opposite the legs, and two junior tables. A felt joins to the lower plate opposite the lower cover thus preventing scratches. The lower plate and the upper plate have generally rectangular flat, planar forms and a generally mutually parallel orientation. The four legs also have a generally mutually parallel and spaced apart orientation. Each of the legs has a firm mechanical connection to the lower plate and the upper plate. And a cushion adheres between the lower plate and the felt limiting the mechanical connection abrading a supporting surface. The junior tables then provide platforms for bowls so pets eat simultaneously while separated vertically.

10 Claims, 6 Drawing Sheets

(56) References Cited

U.S. PATENT DOCUMENTS

2008/0282987 A1* 11/2008 Ritchey ............... A01K 1/0353
119/28.5

* cited by examiner

MULTI-LEVEL PET TABLE

CROSS-REFERENCE TO RELATED APPLICATION

This non-provisional application claims priority to provisional application Ser. No. 62/042,873 filed on Aug. 28, 2014 and all applications are owned by the same inventor.

BACKGROUND OF THE INVENTION

The present invention relates to furniture suitable for pets in a residence. The Multi-Level Pet Table has particular utility in seating multiple pets for simultaneous eating.

The Multi-Level Pet Table is desirable for positioning multiple pets, typically cats and alternatively other small household pets, in a minimum of surface area but allow the pets to eat at the same time. Often owners start with one pet, hereinafter a cat. A cat typically eats where it would like, but generally near where an owner places a food bowl. A single cat generally eats from a bowl placed upon a floor of a home or other residence. An owner generally keeps the bowl in the same place, usually out of a traffic pathway or doorway. Homes come in various shapes and sizes ranging from mansions of many rooms to apartments of a single room. As the home becomes smaller, usage of floor space becomes a key interest of an owner and others living in a home, including pets. Owners and others dislike stepping upon each other in smaller spaces while a cat shows pronounced displeasure if a person steps on a tail or otherwise annoys a cat.

From time to time, an owner receives inspiration to provide a home for an additional cat, or perhaps more cats. In larger homes and rooms, an owner deploys multiple food bowls and water bowls for the various cats in the home. A wise owner trains the cats to eat and drink from just their own bowls. Such behavior promotes peaceful living with sometimes territorial cats. As with a single cat arrangement, an owner places bowls upon the floor so that multiple cats may access them. However, smaller homes and rooms limit the floor space available for multiple bowls.

DESCRIPTION OF THE PRIOR ART

Many owners have had multiple cats. Such owners have utilized various feeding devices and equipment for the multiple cats. Some owners have used bowls for the cats formed as a single unit. The single unit has the bowls generally arrayed along a line upon a common plane. For cats of pleasant temperament, a gang of bowls works well. Other cats have more territorial temperaments and owners use spaced apart bowls. Typically owners space the bowls apart upon a common floor, such as a kitchen. With sufficient spacing, territorial cats consume their meals with a minimum of fuss between them.

From time to time, owners of cats utilize towers. The towers provide a play setting for cats. The towers have many heights but typically remain below elevations seen in houses, usually under eight feet in height. A Lotus Cat Tower advertised in SkyMall® magazine shows a tower with a base of a box and a curved stem extending from one edge of the box. The stem has two parallel and spaced apart decks upon cantilevers and a top most curved deck centered upon the tower, also with a cantilever connection to the stem. Each parallel deck has a nearby aperture through the stem so a cat may walk end to end upon a deck. The parallel decks have a width less then that of the tower and are mutually offset.

Though preceding description has referred to residential settings, the description also applies to cats kept in light industrial and other facilities for rodent control. While the above-described devices fulfill their respective, particular objectives and requirements, the aforementioned devices do not describe a Multi-Level Pet Table that permits multiple cats to feed simultaneously.

Therefore, a need exists for new and improved Multi-Level Pet Table that can be used for providing places for cats to eat their meals in a minimum of surface area within a residence. In this regard, the present invention substantially fulfills this need. In this respect, the Multi-Level Pet Table according to the present invention substantially departs from the conventional concepts and designs of the prior art, and in doing so provides a device primarily developed for the purpose of separating cats who eat simultaneously in a minimum of surface area in a home, an office, a light industrial setting, and the like.

The Multi-Level Pet Table overcomes the above-mentioned disadvantages and drawbacks of the prior art. As such, the general purpose of the present invention, which will be described subsequently in greater detail, is to provide a new and improved Multi-Level Pet Table which has all the advantages of the prior art mentioned heretofore and many novel features that result in Multi-Level Pet Table which are not anticipated, rendered obvious, suggested, or even implied by the prior art, either alone or in any combination thereof.

SUMMARY OF THE INVENTION

The Multi-Level Pet Table has a lower plate, a lower cover upon the lower plate, four legs upon corners of the lower plate, an upper plate connecting to the four legs upon its corners, an upper cover upon the upper plate opposite the legs, and two boxes. The lower plate and the upper plate have generally rectangular flat, planar forms and a generally mutually parallel orientation. The four legs also have a generally mutually parallel and spaced apart orientation. Each of the legs has a firm mechanical connection to the lower plate and the upper plate. The boxes then provide platforms for food bowls of pets.

An alternate embodiment of the invention appeared in a kitchen where multiple cats, or other pets, put it to immediate use. This embodiment had only an upper cover. When an owner adds a cat, an owner has to consider feeding of both of them. The present invention in its embodiments provides a way to feed multiple pets, such as cats, one above the other, that is, in the same floor space previously used for one cat. During usage, one cat jumps to the upper plate of the invention to eat a meal and the other cat walks upon the lower plate to eat too, under the upper cat.

There has thus been outlined, rather broadly, the more important features of the invention in order that the detailed description thereof that follows may be better understood and in order that the present contribution to the art may be better appreciated.

The Multi-Level Pet Table may also include adhesive connections of legs to the upper plate and the lower plate, and between the upper cover to the upper plate and the lower cover to the lower plate. In an alternate embodiment, the lower cover has its corners incised so that the legs have direct contact to the lower plate. The invention may also be known as the Victoria Space-Saver Pet Table™. Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved Multi-Level Pet Table that may be easily and efficiently manufactured and marketed to the consuming public.

Still another object of the present invention is to provide a Multi-Level Pet Table for separating pets for simultaneous eating when indoors.

Still another object of the present invention is to provide a Multi-Level Pet Table that occupies a minimum of surface area in a home, thus saving space for a pet owner.

Still another object of the present invention is to provide a Multi-Level Pet Table that minimizes tipping of the invention during usage.

Still another object of the present invention is to provide a Multi-Level Pet Table that avoids scratching a supporting surface, such as a floor.

Still another object of the present invention is to provide a Multi-Level Pet Table that fits through a doorway.

Still another object of the present invention is to provide a Multi-Level Pet Table that allows multiple pets to eat simultaneously thus saving time of a pet owner.

Still another object of the present invention is to provide a Multi-Level Pet Table that lessens the burdens and hassles upon a pet owner.

Still another object of the present invention is to provide a Multi-Level Pet Table that reduces the bending of a pet owner to fill and otherwise maintain pet bowls where the invention elevates pet bowls to a convenient height accessible by a pet owner with little or no bending, thus saving the pet owner's back.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
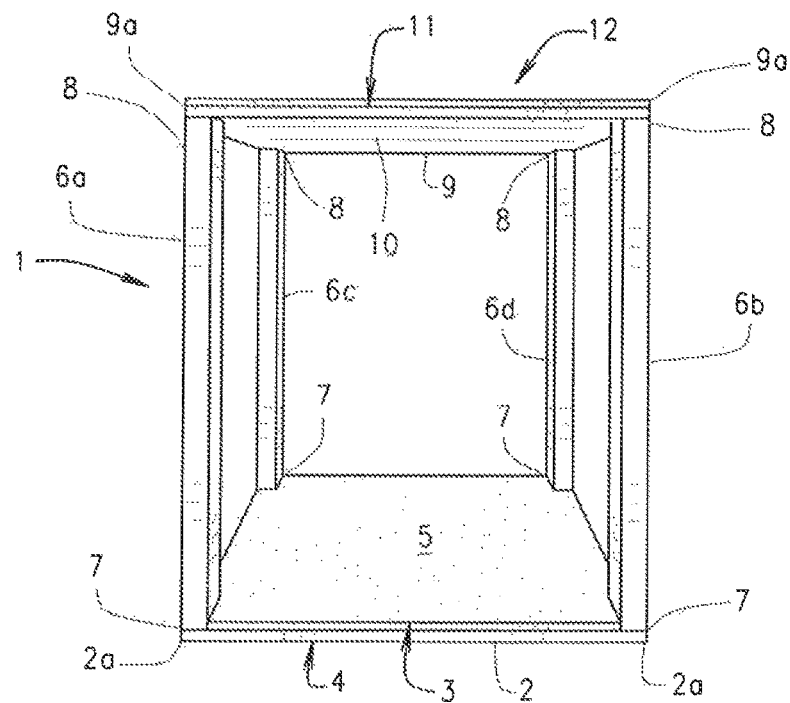
FIG. 1 is a front view of the preferred embodiment of the present invention.

Referring now to the drawings, and particularly to FIGS. 1-10B, a preferred embodiment of the Multi-Level Pet Table of the present invention is shown by the reference numeral 1. In FIG. 1, the present invention 1 has a lower plate 2 having a generally rectangular flat planar shape, here shown as square. The lower plate has a thickness and construction of rigid planar material, such as plywood. The lower plate has four corners, as at 2a. The lower plate has a lower surface 3 that adjoins a floor or other supporting surface and an opposite upper surface 4 generally inwardly. The upper surface receives a lower cover 5 generally upon the entire upper surface. The lower cover provides protection to the lower plate from the paws of pets and also cushions those paws. The lower cover may be made of carpet, simulated turf, EPDM rubber, and other durable cushioning material. The lower cover material has a texture that prevents cats, and their paws particularly, from slipping. Upon each of the four corners 2a, the invention has four legs 6 denoted as a first leg 6a, a second leg 6b, a third leg 6c, and a fourth leg 6d. The legs have a generally slender, elongated shape and a foot 7 and an opposite knee 8. Each foot adjoins the lower plate 2. In the preferred embodiment, each foot rests upon the lower cover 5 at a corner and then attaches to the lower plate using mechanical fasteners such as a pattern of four nails and centered wood screw, or at least two nails and at least one screw, or at least two mechanical fasteners. A leg has an approximate width of two inches and a plate has an approximate thickness of ½ inch. Typically a leg has a thickness approximately four times that of a plate.

Opposite each foot 7, each leg has its knee 8 that connects to an upper plate 9. The upper plate has its lower surface 10 and an opposite upper surface 11. The lower surface has its four corners 10a that receive the knees 8 of each foot using mechanical fasteners such as a pattern of four nails and centered wood screw, at least two nails and at least one screw, or at least three mechanical fasteners. The upper plate has a generally rectangular flat planar shape, a thickness, and construction of rigid planar material, such as plywood. Opposite the legs, the upper plate receives the upper cover 12 of similar construction and material as the lower cover 5 that protects it from the paws of pets and also cushions them. The upper cover may be made of carpet, simulated turf, EPDM rubber or ethylene propylene diene monomer, and other durable cushioning material. The upper cover material also has a texture that prevents cats, and their paws particularly, from slipping. In the preferred embodiment, the legs 6 have a rectangular cross section, preferably square. The cross section preferably remains constant along the length of each leg. The upper plate is generally mutually parallel and spaced above the lower plate. The legs are also mutually parallel and spaced apart at the corners of both plates so that the legs remain generally perpendicular to both plates. Alternatively, each leg has a cross section that narrows along the length to suit aesthetic criteria while remaining structurally sound, that is, thickened at the foot and the knee.

Figure 2:
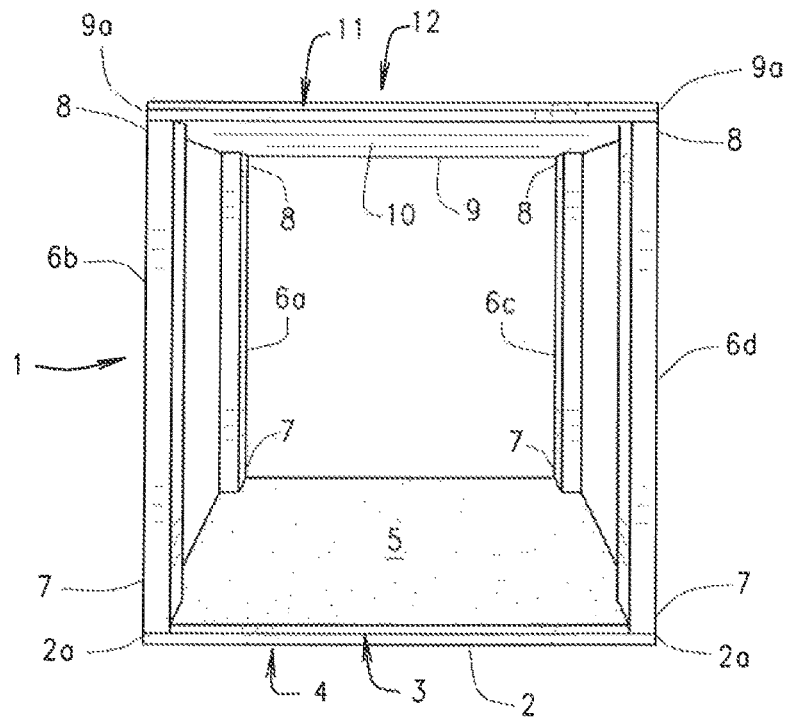
FIG. 2 is a side view of the present invention.

FIG. 2 shows a side view of the invention with the second leg 6b and the fourth leg 6d in the foreground and the first leg 6a and the third leg 6c in the background. In the preferred embodiment, the invention 1 is generally symmetric upon two axes, that is, the front and back views appear the same and the side views from the left and the right appear the same. As above, the invention 1 has its upper cover 12 upon the upper surface 11 of the upper plate 9. The upper plate connects to the knees 8 of the legs 6 at the corners 9a. From the knees, the legs 6 descend to the lower cover 5 upon the upper surface 4 of the lower plate 2. The lower plate then presents its lower surface 3 to a floor or other supporting surface as shown. In an alternate embodiment, the lower cover has its corners incised or truncated so that the feet 2 of the legs 6 have direct contact to the upper surface 4 of the lower plate. In a further alternate embodiment, each leg 6 has a brace, not shown, proximate each knee along one or both edges of the upper plate at the knee. The brace has a shape of a cooperative form to the aesthetics of the table 1 while serving as structural reinforcement between each leg and the upper plate.

Figure 3:
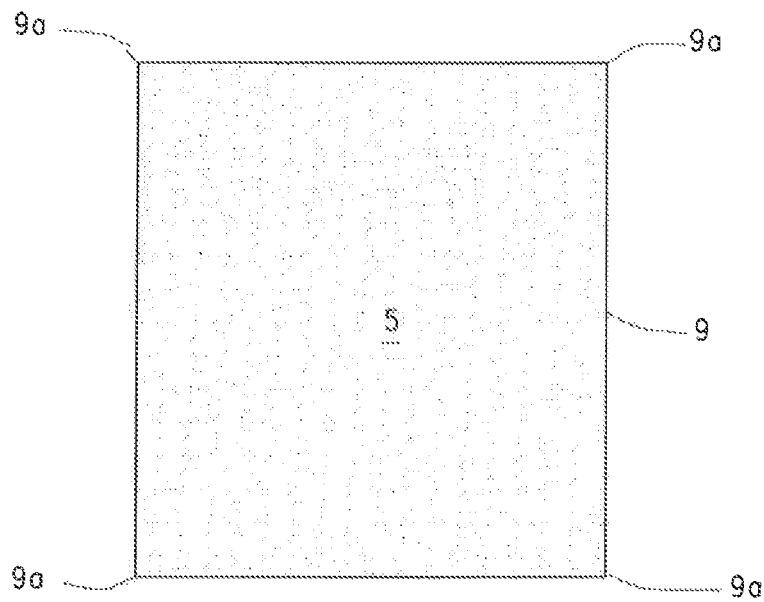
FIG. 3 shows a top view.
Figure 4:
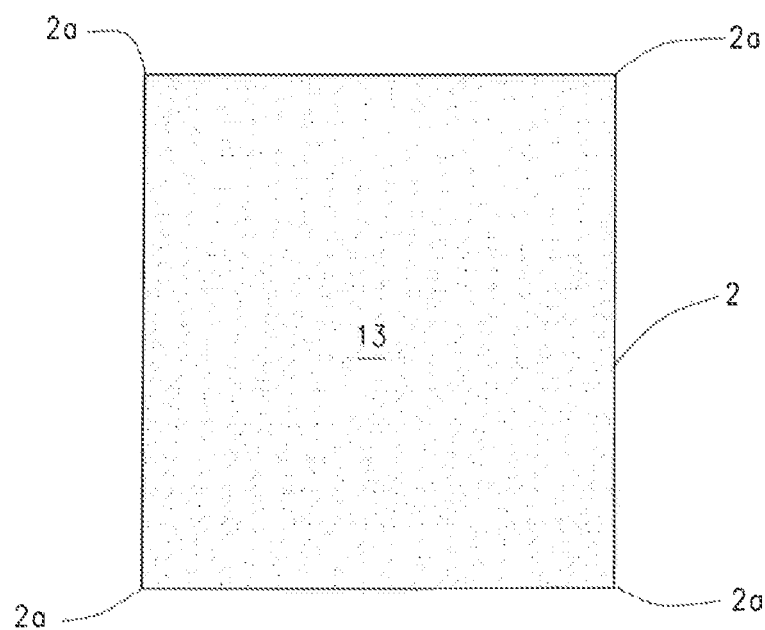
FIG. 4 illustrates a bottom view.

Turning the invention, a user, such as a cat perhaps named Victoria, Stephanie, Tiffany, or Dixie, would alight upon the upper cover 5, that is, the top of the invention shown in FIG. 3. The upper cover has a generally rectangular form, often shown as square, and has the four corners 9a of the upper plate 9 beneath it. The upper cover has a construction and material that cushions the paws of a pet, provides some gripping surface to the pet, and connects to the upper plate.

After the user, or pets, or cats named Victoria, Stephanie, Tiffany, or Dixie, have eaten, a pet owner may have to clean the invention 1. A pet owner may turn the invention up, that is, to show the lower surface 4 of the lower plate 2. The lower surface includes a bottom cover 13, such as felt as shown. The bottom cover also has a rectangular shape, here shown as square, that extends upon the four corners of the lower plate 2 above it. The bottom cover has construction and materials that provide grip of the invention to a supporting surface but yet prevent scratching of that surface. Though felt is shown, the applicant foresees alternate materials utilized for the bottom cover. The preceding description has mentioned covers attaching to adjacent plates. Such attachment may occur using a variety of adhesives, cohesives, thermo resins, epoxies, and the like.

Figure 5:
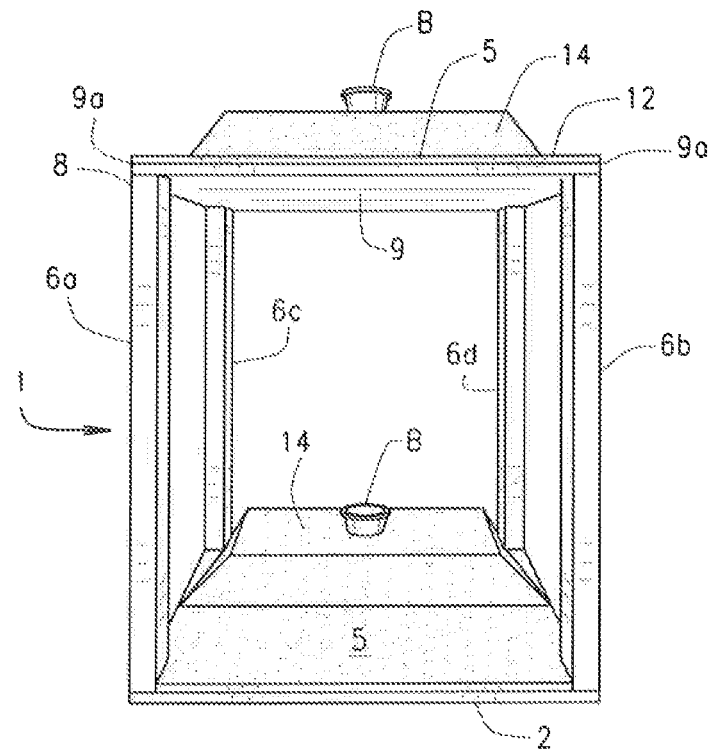
FIG. 5 describes a front view of the invention with boxes.

In an alternate embodiment, the invention 1 has its upper plate 9 upon the legs 6a-d connected to the lower plate 2 but also includes two junior tables 14 as shown in FIG. 5, or at least one junior table placed at the user's discretion. One junior table 14 is placed upon the lower plate 2 and the other junior table is placed upon the upper plate 9, often one junior table above the other. The junior tables rest upon the upper cover and lower cover respectively. Each junior table has a generally rectilinear wooden frame with a height suitable for a cat to reach with her chin, a depth suitable for stability of the junior table and resistance to tipping by a pet, and a width slightly less than the spacing between any two legs 6a-d. The width of the junior table allows a pet owner to insert the junior table from a convenient side of the invention. Upon each junior table, a fabric cover drapes downwardly as shown and includes a portion of the upper cover and lower cover respectively to match those other components of the invention. In a further alternate embodiment, the fabric covers have a sheet of smooth planar material affixed to them. In a further alternate embodiment, the fabric covers include selective stitching relative to their corners so that the fabric covers drape over the edges of the junior tables and the corners of the fabric covers fold upon the adjacent surfaces of a junior table. In the alternate embodiment, the fabric covers has a generally rectangular shape in plan view with a width and a length greater than the width, and the depth and the height of a junior table combined. The fabric covers may have a material that differs from the upper cover and the lower cover. Upon each junior table, the invention permits placement of a bowl, as at B, for holding a meal for a pet or other user.

Figure 6:
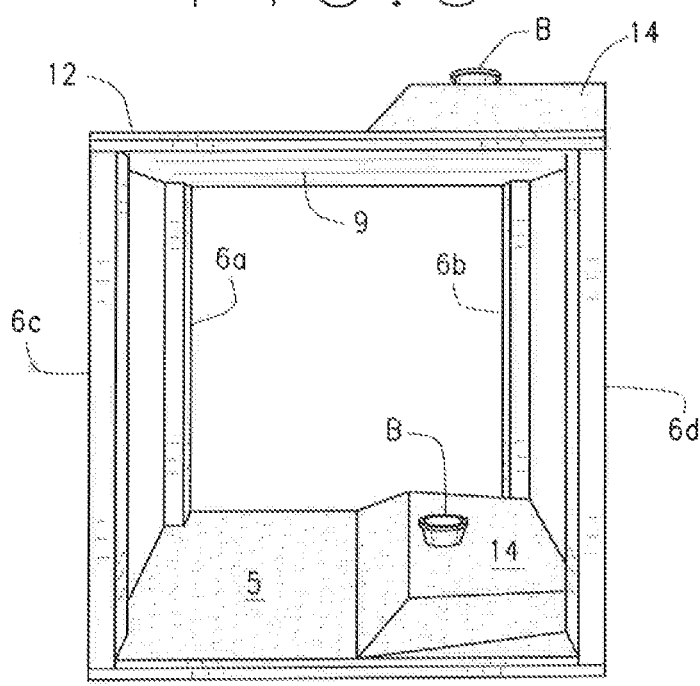
FIG. 6 provides a side view of the invention with boxes.

Turning the alternate embodiment to the side, FIG. 6 shows the invention with its upper plate upon legs connected to the lower plate. The upper plate 9 includes a box, or junior table 14, of a small box like shape, upon the upper cover 12 as previously described. The junior table has similar construction as the remainder of the invention with the lower plate connecting the upper plate upon legs, though the legs have much less length in the junior table. The box also has a fabric cover draped upon it and extending downwardly for the height of the box. The junior table also has a layer of felt upon its own bottom similar to that upon the lower plate. In use, a bowl B rests upon the box. The box has a position upon the upper cover 12 away from the front of the invention, that is the first leg 6a and the second leg 6b. A junior table 14 also has its position upon the lower cover 5 as shown towards the back, that is, the third leg 6c and the fourth leg 6d. In this figure, the junior tables 14 generally appear one above the other. However, a pet owner may arrange the junior tables as suitable for the comfort of the pet and peace of mind of the pet owner. The fabric covers upon the junior tables separate readily from the boxes to permit cleaning of the fabric covers from time to time.

Figure 7:
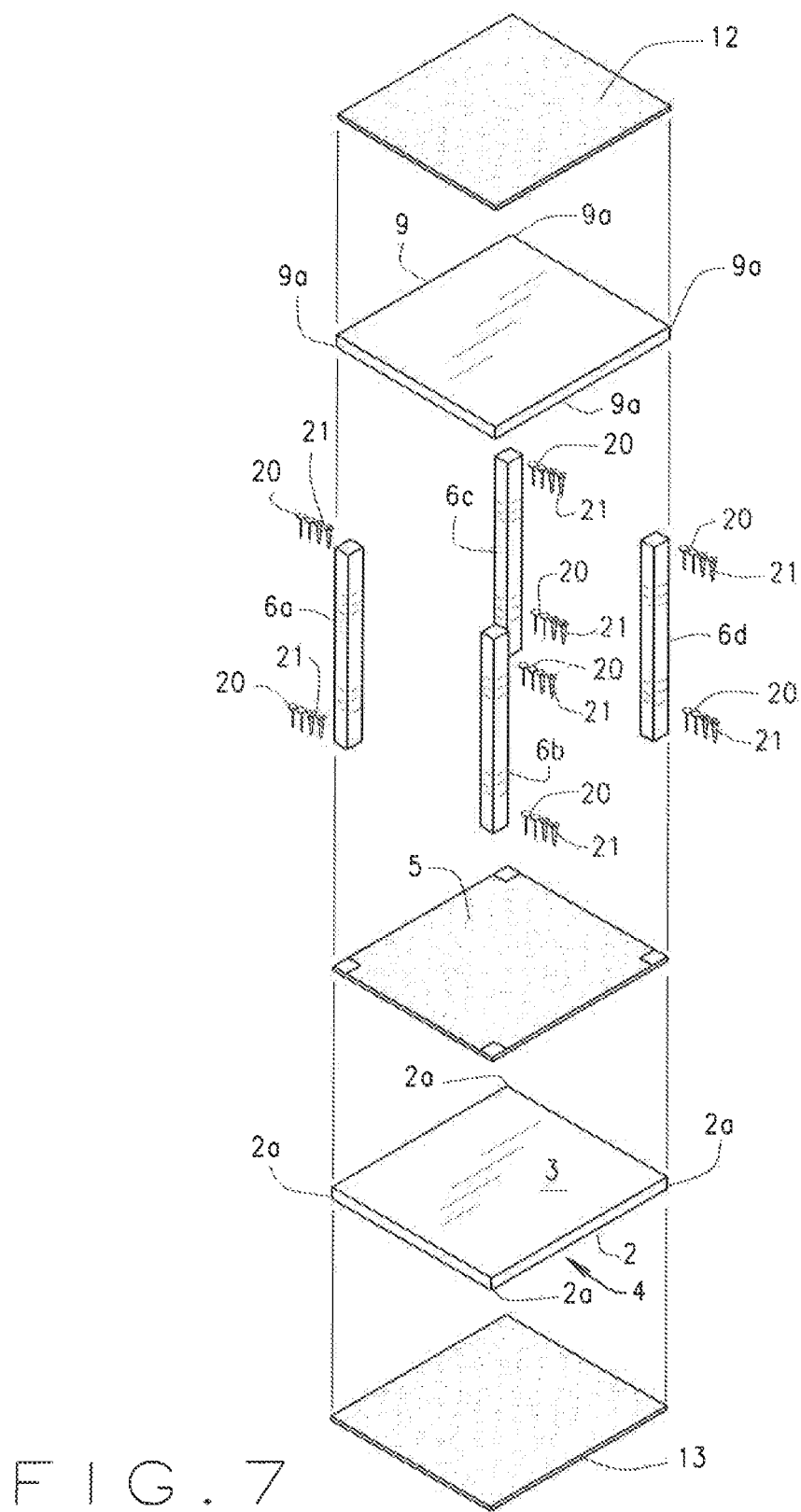
FIG. 7 provides an exploded view.

FIG. 7 shows an exploded view of the invention 1 with a felt pad 13 shown at the lower left of the figure representing the bottom of the invention. The felt pad 13 joins to the lower plate 2 particularly upon its lower surface 4. The felt pad has an adhesive connection to the lower surface 4. Adhesives referenced in this application include pressure sensitive, peel and stick, water based glues, such as Elmer's® of Elmer's Products, Inc., Westerville, Ohio, aliphatic resins, epoxies, and the like. The adhesive and any off-gasses should be tolerable to pets. The lower plate has its lower surface and oppositely, its upper surface 3 as shown. The felt pad and the lower plate have a rectangular surface, preferably square as shown. The lower plate has its four corners as at 2a equally spaced as shown. The upper surface 3 receives the lower cover 5 with an adhesive connection or alternatively a stapled connection. In the preferred embodiment, the lower cover has a rectangular shape similar to that of the lower plate 2. In the alternate embodiment, the lower cover has its corners incised to the dimensions of a leg 6 so that the leg has a contiguous abutment to the upper surface 3 at the corners with the lower cover adjacent to the leg upon two surfaces. Extending upwardly from the lower plate, that is, from the upper surface 3 and opposite the lower surface 4, the invention has its four legs 6 as in the first leg 6a, the second leg 6b, the third leg 6c, and the fourth leg 6d. The legs have a slender, elongated prismatic shape with a typically square cross section. As described above, the legs may have alternate cross sections. The legs have a length greater than the thickness of the lower plate and approximately that of the edges of the lower plate and the upper plate. Each leg has a foot and an opposite knee that connect with the lower plate and the upper plate respectively. The legs connect to the lower plate and the upper plate using at least two nails or at least one wood screw or other mechanical fasteners and a layer of adhesive for permanent connection. The knees of the legs connect to the corners 9a of the upper plate 9 generally upon the lower surface 10 of the upper plate. Opposite the lower surface, the upper plate has its upper surface 11 that receives the upper cover 12. The upper cover joins to the upper plate using an adhesive, stapling, or other mechanical connection. The upper cover has a rectangular shape that matches the shape of the upper plate. Generally the upper cover, upper plate, lower cover, lower plate, and felt pad have similar width and length. Overall, the invention has a cube shape based upon a two foot nominal dimension.

Figure 8:
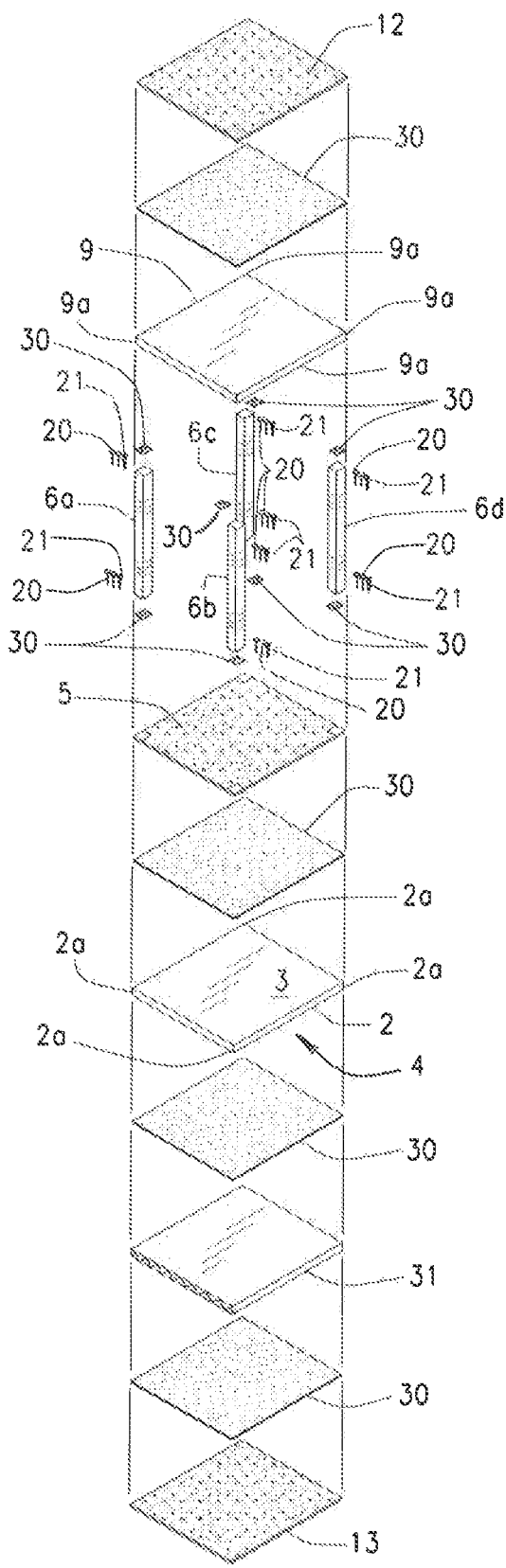
FIG. 8 provides an exploded view with an additional layer.

FIG. 8 then shows another exploded view of the preferred embodiment of the invention 1 with a felt pad 13 shown at the lower center of the figure representing the bottom of the invention, outwardly from the lower plate, that is, it abuts a floor or supporting surface. A user and pet owner sees the felt pad 13 joined to the lower plate 2 particularly upon its lower surface 4 when fully assembled. In this Figure, the felt pad has adhesive applied upon its entire surface as at 30 and then joined to a sheet of cardboard, cardstock, kraft paper, paper, or like cushion material as at 31, typically rectangular in shape. The rectangular sheet, as at 31, provides a cushion for slightly out of position nailing and installation of screws when securing legs to the lower plate. The rectangular sheet, as at 31, operates to soften the heads of mechanical fasteners, nails, screws and such to prevent scratching of floors and other supporting surface. The rectangular sheet of cardboard, cardstock, and the like, as at 31, also has an adhesive connection to the lower surface 4. As before, the lower plate has its lower surface and oppositely, its upper surface 3 as shown. The felt pad and the lower plate have a rectangular surface, preferably square as shown. The lower plate has its four corners as at 2a equally spaced as shown. The upper surface 3 receives the lower cover 5 with an adhesive connection or alternatively a stapled connection. The lower cover has a rectangular shape similar to that of the lower plate 2. As before, the invention has its four legs 6 of a slender, elongated prismatic shape with a typically square cross section. As described above, the legs may have alternate cross sections. Each leg has a foot and an opposite knee that connect with the lower plate and the upper plate respectively. The feet connect to the lower plate using at least two nails, at least one wood screw, or other mechanical fasteners and a layer of adhesive for permanent connection. The knees of the legs connect to the corners 9a of the upper plate 9 generally upon the lower surface 10 of the upper plate. The knees connect to the upper plate using at least two nails and at least one wood screw or other mechanical fasteners and a layer of adhesive for permanent connection. Opposite the lower surface, the upper plate has its upper surface 11 that receives the upper cover 12. The upper cover joins to the upper plate using an adhesive, stapling, or other mechanical connection. Generally the upper cover, upper plate, lower cover, lower plate, and felt pad have similar width and length. As shown in FIGS. 7, 8, the mechanical fasteners, nails and screws, have a generally mutually parallel and spaced apart orientation, and generally parallel to the length of the leg. Beneath each foot, the mechanical fasteners have a spacing along a diagonal line.

Figure 9:
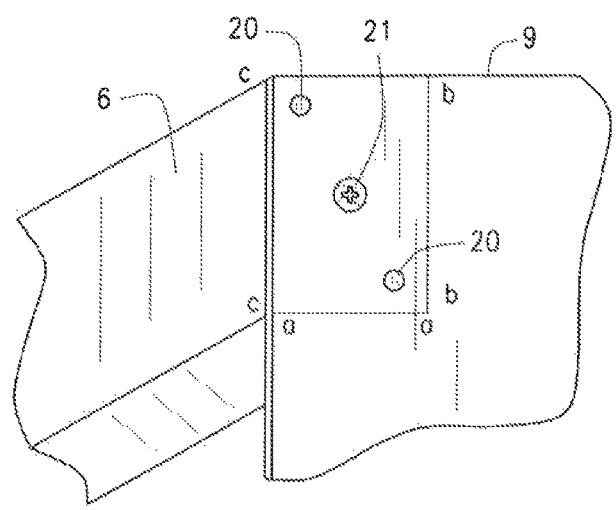
FIG. 9 provides a partial detail view of a knee connection.

FIG. 9 shows a detailed view from the top of a leg 6 connecting to the upper plate 9. The leg connects at a corner of the upper plate with two nails 20 spaced about a screw 21. The heads of the nails and the screw appear along the same line extending across diagonally upon the knee of a leg. The knee connects at the corner and has two edges beneath the upper plate as at lines a-a, b-b, where the two lines intersect at a common corner inwardly from the corner of the plate. The two lines, a-a, b-b are generally perpendicular. The heads of the nails and the screw are upon a line extending from the intersection of lines a-a, b-b outwardly to the outermost corner or edge of the leg. The mechanical fasteners, nails and screws, have a generally mutually parallel and spaced apart orientation, and generally parallel to the length of the leg. Beneath each foot, the mechanical fasteners have a spacing along a diagonal line.

The positioning of the nails and the screws this way secures the leg against rotation in either a clockwise or a counterclockwise direction. The mechanical fasteners cooperate with the width of the leg at the knee and the thickness of the upper plate to resist the shear forces and bending moments imparted to the knee when a pet alights upon the upper plate. The width of the leg at the knee is approximately four times the thickness of the upper plate. The upper plate has a construction of inherent stiffness, such as adhesively joined layers in plywood or adhesively joined chips in chipboard, that resists bending moments and shear forces while transmitting them to nearby legs. The upper plate utilizes its panel diaphragm strength. The mechanical fasteners, spaced apart upon the width of a leg, in cooperation with the adhesive applied resist pullout and uplift when the upper plate imparts a load. Further each leg has a thickness causing a slenderness ratio in excess of its Euler number so that leg buckling does not occur when a pet alights upon the upper plate. Then, the mechanical fasteners cooperate with the width of the leg at the foot and the thickness of the lower plate to resist primarily the shear forces and axial forces, and any residual bending moments imparted to the foot when a pet alights upon the upper plate, sending a load into the leg and down to the foot. The width of the leg at the foot is also approximately four times the thickness of the lower plate. The lower plate too plate has an inherently stiff construction, such as adhesively joined layers in plywood or adhesively joined chips in chipboard, that resists axial forces, shear forces, and bending moments while transmitting them to a supporting surface such as a floor. The mechanical fasteners, spaced apart upon the width of a leg, in cooperation with the applied adhesive resist pullout and shear when the leg imparts a load to the lower plate. The lower plate also utilizes its panel diaphragm as strength to support various loads upon it.

Figure 10A:
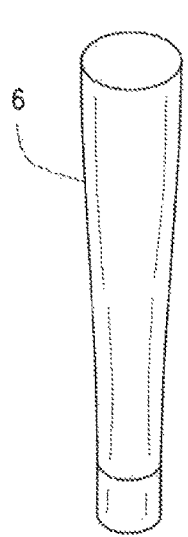
FIG. 10A shows a side view of one alternate embodiment of the legs and FIG. 10B shows a side view of another alternate embodiment of the legs.
Figure 10B:
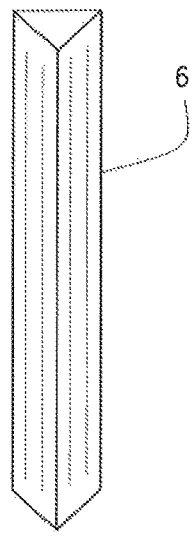

And, legs for the invention may have additional forms suitable to the taste and locations of pet owners. FIG. 10A provides a side view of a leg 6 with a generally round cross section and a slight tapering downwardly. This alternate embodiment may also have a reinforced foot, such as a brass cylinder. FIG. 10B then shows another alternate embodiment of a leg with a generally triangular cross section. This other alternate embodiment saves weight and provides additional surfaces against which a pet may rub or nuzzle.

The present invention in its preferred and alternate embodiments stands ready to serve pets of all kinds, particularly cats, and their owners in various room types and buildings.

While a preferred embodiment of the Multi-Level Pet Table has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, polymer, metal, composite, pine for the legs, birch plywood for the upper plate and the lower plate, textiles, carpeting for the upper cover and the lower cover, or another variety of wood may be used instead of the wooden components described. Although providing places for simultaneous eating by pets has been described, it should be appreciated that the Multi-Level Pet Table herein described is also suitable for apartments, condominiums, dormitory rooms, houses, offices, light industrial facilities, warehouses, garages, motor pools, select mines, and the like where a pet, such as a cat, can find a home.

The Applicant reminds the reader that the invention is not a toy, it is not designed for a person to lean upon, stand upon, sit on, nor is it suitable for supporting a load exceeding twenty five pounds. The present invention is for supporting the weight of a typical house cat, or even a small dog, of twenty five pounds or less in weight. The present invention may have its edges rounded over or sanded smooth, painting in a variety of colors, and application of additional mechanical fasteners where suitable.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A furniture device of multiple levels upon which pets consume meals, comprising:
    a lower plate, generally rectangular, flat, planar, and rigid, and having four corners;
    four legs, generally elongated and slender, each of said legs connecting to one of said corners of said lower plate;
    an upper plate, generally rectangular, flat, planar, and rigid, and having four corners, said upper plate being spaced apart and mutually parallel to said lower plate, each of said legs connecting to one of said corners of said upper plate wherein said legs are spaced apart and mutually parallel and perpendicular to said lower plate and said upper plate;
    a lower cover upon said lower plate and an upper cover upon said upper plate;
    said lower plate having a lower surface and an opposite upper surface, said upper surface receiving said lower cover and said lower surface being adapted to locate proximate a supporting surface;
    said upper plate having a lower surface and an opposite upper surface, said upper surface receiving said upper cover;
    said upper cover connecting to said upper surface of said upper plate by an adhesive;
    said lower cover connecting to said upper surface of said lower plate by an adhesive;
    a sheet of one of cardboard, cardstock, kraft paper, or paper, connecting to said lower surface of said lower plate by an adhesive and opposite said lower cover; and,
    a felt pad connecting to said sheet of one of cardboard, cardstock, kraft paper, or paper by an adhesive and outwardly from said lower plate.

2. The furniture device of claim 1 further comprising:
    each of said legs having a foot and an opposite knee, each of said feet connecting to said lower plate and each of said knees connecting to said upper plate;
    each of said legs having a width, said lower plate having a thickness and said upper plate having a thickness, wherein the width of each of said legs is approximately four times the thickness of said lower plate and approximately four times the thickness of said upper plate;
    each of said feet connecting using two nails and an adhesive between each of said feet and said upper surface of said lower plate; and, each of said knees connecting using two nails and one wood screw and adhesive between each of said knees and said lower surface of said upper plate.

3. The furniture device of claim 2 further comprising:
upon each of said feet, said two nails being mutually parallel and spaced apart and spaced along a diagonal line; and,
upon each of said knees, said wood screw positioning between said two nails, said two nails and said wood screw being mutually parallel and spaced apart and spaced along a diagonal line.

4. The furniture device of claim 2 further comprising:
at least one junior table being positioned upon at least one of said upper plate and said lower plate, said at least one junior table having a bottom and a felt pad upon said bottom.

5. A furniture device of multiple levels upon which pets consume meals, comprising:
four legs, generally elongated and slender, said legs being mutually parallel and spaced apart, each of said legs having a foot and an opposite knee;
an upper plate, generally rectangular, flat, planar, and rigid, and having four corners, said knee of each of said legs connecting to one of said corners of said upper plate wherein said legs are perpendicular to said upper plate;
a lower plate, generally rectangular, flat, planar, and rigid, and having four corners in registration with the corners of said upper plate, said foot of each of said legs connecting to one of said corners of said lower plate wherein said legs are perpendicular to said lower plate, and said lower plate being spaced apart and mutually parallel to said upper plate;
an upper cover upon said upper plate, said upper cover having a texture suitable to gripping by a pet and a lower cover upon said lower plate having a texture suitable to gripping by a pet;
said upper plate having a lower surface and an opposite upper surface, said upper surface receiving said upper cover;
said lower plate having a lower surface and an opposite upper surface, said upper surface receiving said lower cover and said lower surface being adapted to locate proximate a supporting surface;
said lower cover connecting to said upper surface of said lower plate by an adhesive;
said upper cover connecting to said upper surface of said upper plate by an adhesive;
a sheet of thin cushion connecting to said lower surface of said lower plate by an adhesive and opposite said lower cover; and,
a sheet of felt connecting to said sheet of thin cushion by an adhesive and outwardly from said lower plate.

6. The furniture device of claim 5 wherein said thin sheet of cushion is one of cardboard, cardstock, kraft paper, or paper.

7. The furniture device of claim 5 further comprising:
each of said legs having a width, said lower plate having a thickness and said upper plate having a thickness, wherein the width of each of said legs is approximately four times the thickness of said lower plate and is approximately four times the thickness of said upper plate;
each of said feet connecting using two nails and an adhesive between each of said feet and said upper surface of said lower plate; and,
each of said knees connecting using two nails and one wood screw and adhesive between each of said knees and said lower surface of said upper plate.

8. The furniture device of claim 7 further comprising:
upon each of said feet, said two nails being mutually parallel and spaced apart and spaced along a diagonal line; and,
upon each of said knees, said wood screw positioning between said two nails, said two nails and said wood screw being mutually parallel and spaced apart and spaced along a diagonal line.

9. The furniture device of claim 5 further comprising:
at least one junior table being positioned upon one of said upper plate and said lower plate, said at least one junior table having a bottom and a felt pad upon said bottom.

10. A furniture device of multiple levels upon which pets consume meals, comprising:
a lower plate, generally rectangular, flat, planar, and rigid, and having four corners, said lower plate having a lower surface and an opposite upper surface, said lower surface being adapted to locate proximate a supporting surface;
four legs, generally elongated and slender, each of said legs connecting to one of said corners of said lower plate;
an upper plate, generally rectangular, flat, planar, and rigid, and having four corners, said upper plate being spaced apart and mutually parallel to said lower plate, said upper plate having a lower surface and an opposite upper surface, said upper surface receiving an upper cover;
each of said legs connecting to one of said corners of said lower plate wherein said legs are spaced apart and mutually parallel and perpendicular to said lower plate and said upper plate;
a lower cover connecting to said upper surface of said lower plate by an adhesive and said upper cover connecting to said upper surface of said upper plate by an adhesive;
a sheet of one of cardboard, cardstock, kraft paper, or paper, connecting to said lower surface of said lower plate by an adhesive and opposite said lower cover and a felt pad connecting to said sheet of one of cardboard, cardstock, kraft paper, or paper by an adhesive and outwardly from said lower plate;
each of said legs having a foot and an opposite knee, each of said feet connecting to said lower plate and each of said knees connecting to said upper plate;
each of said feet connecting using two nails and an adhesive between each of said feet and said upper surface of said lower plate;
each of said knees connecting using two nails and one wood screw and adhesive between each of said knees and said lower surface of said upper plate;
upon each of said feet, said two nails being mutually parallel and spaced apart and spaced along a diagonal line; and,
upon each of said knees, said wood screw positioning between said two nails, said two nails and said wood screw being mutually parallel and spaced apart and spaced along a diagonal line.

* * * * *